United States Patent
Gould et al.

[11] 3,957,295
[45] May 18, 1976

[54] PIPE COUPLING SEAL

[75] Inventors: William Gould; Charna Gould, both of Millburn, N.J.

[73] Assignee: Nyltite Corporation of America, S. Plainfield, N.J.

[22] Filed: Jan. 31, 1975

[21] Appl. No.: 545,997

[52] U.S. Cl. .................. 285/342; 277/110; 285/354; 285/382.7
[51] Int. Cl.² ................. F16L 19/00
[58] Field of Search ............ 285/337, 342, 382.7, 285/248, 249, 354; 85/50 R; 277/110, 112, 205, 236

[56] References Cited
UNITED STATES PATENTS

| | | | |
|---|---|---|---|
| 1,715,132 | 5/1929 | Kaplan | 277/110 |
| 2,251,716 | 8/1941 | Parker | 285/382.7 X |
| 2,251,717 | 8/1941 | Parker | 285/382.7 X |
| 2,287,889 | 6/1942 | Krumsiek et al. | 285/342 |
| 3,299,766 | 1/1967 | Gould et al. | 85/50 R |
| 3,424,853 | 1/1969 | Johnson | 285/248 X |
| 3,747,964 | 7/1973 | Nilsen | 285/337 |

FOREIGN PATENTS OR APPLICATIONS

| | | | |
|---|---|---|---|
| 658 | 1910 | United Kingdom | 285/354 |

*Primary Examiner*—Thomas F. Callaghan
*Attorney, Agent, or Firm*—Howard C. Miskin

[57] ABSTRACT

A pipe coupling device includes an externally threaded first tubular coupling element engaged by an internally threaded second tubular element provided with an outer axially bored end wall and an annular nylon sealing member entrapped between the second element end wall and the confronting end face of the first element. The sealing member includes a tubular body section and a reversely curled outer end flange forming a cuff. In application, the second element is slipped onto the end of a pipe, the sealing member is then positioned on the pipe and the second element slid down to overlie the sealing member, then the first element is slipped onto the pipe, and the coupling elements are screw tightened to longitudinally and radially compress the sealing member into pressure engagement with the faces of the annular cavity delineated by the coupling elements and pipe, wherein a groove is formed on the pipe to lock the coupling in place on the pipe.

5 Claims, 3 Drawing Figures

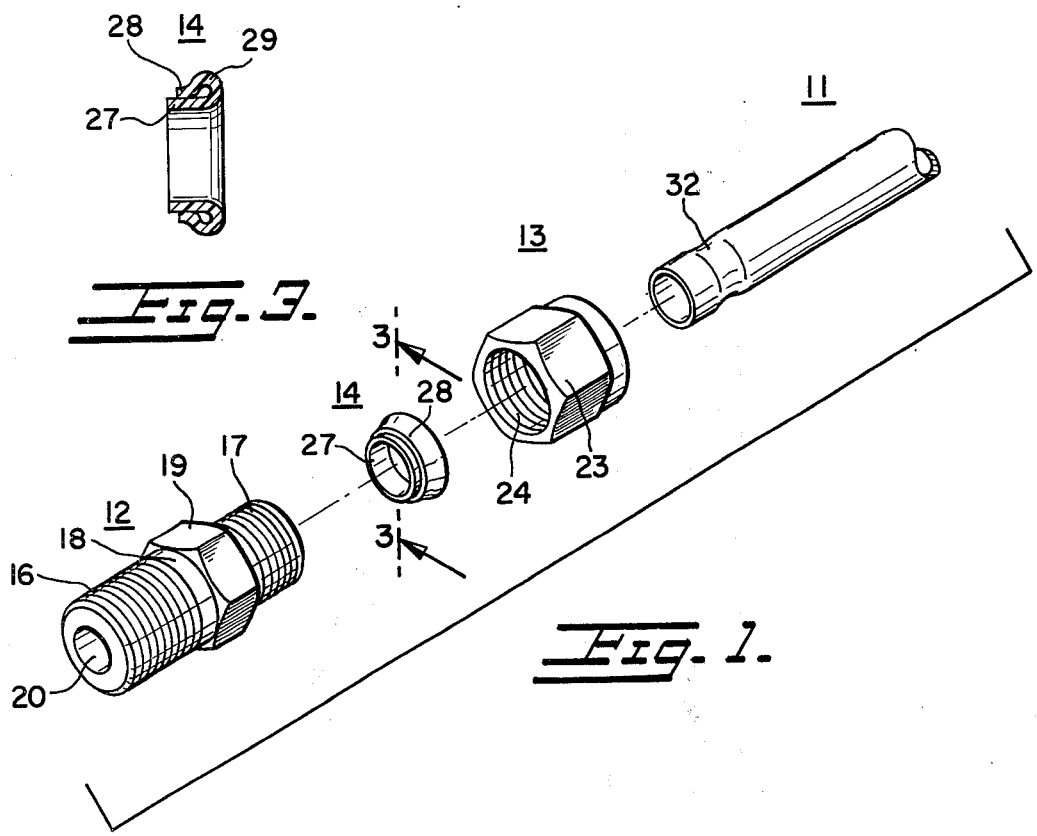
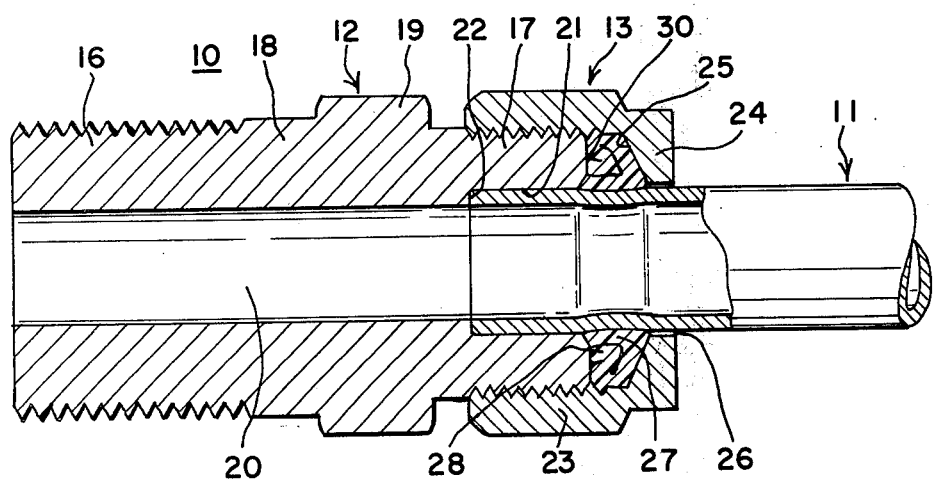

APPARATUS FOR CYLINDERS TO BE FILLED WITH PRESSURISED GAS

The invention concerns an apparatus for cylinders which are to be filled with a pressurised gas, and work in conjunction with a piston rod which leaves the cylinder by means of a seal at the front end of the cylinder.

In particular the present invention concerns cylinders of shock absorbers and of gas-pressure springs. When assembling such cylinders from their component parts the pressurised gas must be put into the cylinders during assembly. This is difficult because the individual parts are not under normal surrounding pressure. Therefore cylinders have already been used with openings through which gas can be passed after assembly, the openings closing afterwards by means of a ball valve. Cylinders have also been used which have an opening for filling with pressurised gas, the opening being pressed or welded closed afterwards. Adding more gas later when part of the pressurised gas has been lost after a long period of operation is not possible in this case.

The aim of the invention is to create an apparatus of the type described at the beginning which allows essentially simpler filling of the cylinders and also makes it possible to top-up later if pressurised gas and damping fluid have been lost through leakage.

This is achieved in the invention by the fact that a segment which is joined to the piston rod at its outlet end and can be pushed out of the seal, has an inner channel which extends in the lengthwise direction of the piston rod and at its end facing the cylinder ends in an opening of the covering surface of the segment of the piston rod, and which at least during assembly can be connected by its other end, which has an axial distance from the said opening of at least the thickness of the seal, to a supply of pressurized gas. The segment can also be an independent filler cap, which can be placed on the free end of the piston rod, in the form of a thick-walled piece of pipe and of a diameter essentially corresponding to that of the piston rod, in the part of which which borders on the end of the piston rod and can be pushed with the latter temporarily into the cylinder there is a recess, which makes a connection to the inner area of the piece of pipe which is open to the outside.

Thus it is possible to fill the cylinder by pushing the piston rod with the segment or filler cap bordering on it so far into the seal of the cylinder that the opening or recess penetrates the interior of the cylinder behind the seal. If then the other end of the segment of the piston rod or of the filler cap is connected to a supply of pressurised gas, the pressurised gas enters the cylinder. When the cylinder has been filled the said segment of the piston rod or the filler cap which is placed on the latter is pushed outwards through the piston rod seal, and the cylinder is then ready for use. In the same way extra pressurised gas or damping fluid can be added later.

To clarify the invention and show other features of it reference is made to the drawings which depict embodiments of the invention.

FIG. 1 shows a first embodiment of the invention for a damped gas-pressure spring shown schematically in longitudinal section, FIG. 2 shows a design variation enlarged and partially in longitudinal section and FIG. 3 shows a cut-away longitudinal section of a further embodiment of the invention.

In FIG. 1 the invention is shown with the aid of a damped gas-pressure spring. The cylinder 1 can be recognised in which there are the space 2 for the pressurised gas and a damping fluid 3. The piston rod 4 bears at an end at a lowered segmet 5 a damping piston 6, segment has valve openings 7 and 8, which for their part can be closed by means of valve disks 9 and 10 which have varying strengths. The piston rod 4 leaves the cylinder 1 downwards through the front seal 11.

In the segment 16 of the piston rod 4 which projects from the cylinder 1 the channel 12 extends centrally in is axial direction to a point at which it meets the cross-bore 15, which starts at the top surface of the piston rod 4.

The lower free end of the piston rod 4 has an inner bore with a thread 13, to which the supply of pressurised gas is connected tightly with greater pressure than the operating pressure of the pressure gas spring. After connection the pressurised gas flows through the channel 12 and the cross-bore 15 and from here passes through the damping fluid 3 and the valves 7 and 8 into the free gas space 2. In this process it is essential that the lower free front surface of the piston 6 is supported, and that moreover the cylinder 1 cannot move upwards. After filling with gas one can remove the load either from the supporting force or the holding force of the cylinder sufficiently for the piston rod 4 to be pushed out of the seal 11 enough. In particular the piston rod 4 is pushed out so that the cross-bore 15 comes outside of the cylinder and its seal 11. When the pressurised gas supply is shut off a thread-bolt can be screwed into the thread 13 to serve as a connection for another part of the machinery and is not shown in the diagram. This thread-bolt can be screwed in so as to make a seal, and only a sealing ring or a sealing disk is necessary. The opening of the cross-bore 15 can also be closed.

As can also be seen from the drawing, filling with pressurised gas is made even more simple by the fact that only the front ring surface of the segment 16 of the piston ring 4 is placed on a seal corresponding to arrow 14, so that when the piston rod 4 has moved in enough and the cylinder is held firmly the gas can be allowed in. During later normal operation the damping piston 6 is naturally in the damping fluid 3.

FIG. 2 shows the lower end of a hydropneumatic shock absorber, in which a damping piston 6 with valve openings 7 and 8 is fixed to the piston rod 4 at its end section 5 which penetrates the cylinder 1. The valve openings 7 and 8 can be covered completely or partially with the aid of spring disks 9 or 10, the latter lifting according to the direction of movement of the damping piston 6. The fixing nut 17 serves to fix the damping piston 6 including the spring disks 9 and 10.

The end of the piston rod which leaves the seal 11 and the guide 18 at the bottom also has a lowered end 19, which can be provided with a thread for example, for later assembly. The piece of pipe 20 serving as a filler cap is placed on this lowered end 19. The inner wall of the piece of pipe 20 has a groove 21, which connects with a wall bore 15. Thus when the piece of pipe 20 is pushed in the pressurised gas can enter the interior of the cylinder 1 in the direction of the arrows 22, 23 and 24.

Preferably the piece of pipe 20 is longer than the end 19, so that the length of the piston rod can be limited to best length for the design. The inner diameter of the piece of pipe 20 is at least as large as the outer diameter of the end 19, but it is advisable to have a small amount of play so that for the purpose of filling it is easy to make a temporary connection of the piston rod and the filler cap.

FIG. 3 shows simply the point of connection of a piston rod 4 and a piece of pipe 20, which are different in the region of the join. The other parts not shown in FIG. 3 correspond to those of FIG. 2. In this case however the end of the piston rod 4 has an axial bore 25, which is used later for the assembly of the shock absorber. The piece of pipe 20 in this case has a pin 26', which can be placed in the bore 25. Moreover, the piece of pipe 20 also has a cross-bore 15 for filling the interior of the cylinder.

The free circular front surface 26 can in any case be loaded with the aid of a pressure foot 27, as shown schematically in FIG. 3. This pressure foot 27 can also have a bore 28, through which the pressurised gas can pass.

The pin 26' with which the piece of pipe as in FIG. 3 projects into the axial bore of the piston rod 4 is so dimensioned, as the inner diameter of the piece of pipe which can be pushed into the cylinder 1 as in FIG. 2, that the piston rod 4 can be easily centered during assembly in this way.

The edge of the segment of the piece of pipe 20 which is pushed into the cylinder 1 and the edge of the piston rod 4 which borders on it are rounded off so that the seal 11 cannot be damaged when it is pushed in and out.

I claim:

1. A fluid-damping cylinder which can be filled with a damping fluid and a pressurized gas from a suitable supply, comprising a housing having a lower portion adapted to contain the damping fluid and an upper portion contiguous therewith and adapted to contain the pressurized gas; a piston mounted for sliding movement within the cylinder between the upper and lower portions and providing a chamber with the housing on either side of the piston, said piston having at least one valve opening therein communicating said chambers with each other and throughout the range of movement of said piston within said cylinder; a piston rod connected to the piston and extending from one side thereof outwardly of the lower end of the cylinder through a seal at least a distance sufficient to permit the piston to be moved into the upper portion of the cylinder containing the pressurized gas, said piston rod having an axial bore, an inlet to said bore adjacent the outer end of the piston rod, and a radial bore communicating with the axial bore, said bores and said inlet forming a communication between the supply and the interior of the chamber on said one side of the piston when said piston is located in the upper portion of the cylinder with said radial bore in communication with the lower chamber but not when the piston is located in the lower portion of the cylinder with said radial bore external to said lower chamber, whereby during assembly or recharging of the cylinder the piston may be extended into the upper portion of the cylinder and gas fed under pressure through said inlet and bores into said cylinder, while during use and when the piston operates in the lower portion of the cylinder the communication is broken, and means for detachably connecting the inlet with the supply of pressurized gas.

2. The cylinder of claim 1, wherein the portion of the piston rod containing the axial and radial bores and inlet is integral with the portion of the piston rod connected to the piston.

3. The cylinder of claim 1, wherein the piston rod includes a separable, hollow rod portion of equivalent outer diameter on its outer end, said separable portion containing the axial and radial bores, said inlet and the supply gas connecting means and being engageable with the outer end of the remaining portion of the piston rod connected to the piston, said separable portion being long enough when engaged with the end of the remaining piston rod to extend the piston into the upper portion of the cylinder whereby the interior of the cylinder communicates through the axial and radial bores with the supply of pressurized gas and short enough to be removable therefrom and to permit the remaining portion of the piston rod to extend beyond the cylinder's seal when the piston operates in the lower portion of the cylinder during use.

4. The cylinder of claim 3, wherein the outer end of the remaining portion of the piston rod has a reduced diameter portion and the axial bore in the separable rod portion extends through said separable rod portion and is of a diameter equivalent to the reduced diameter portion of the piston rod, thereby providing a separable connection between the remaining piston rod and the separable rod portion.

5. The cylinder of claim 3, wherein the outer end of the remaining portion of the piston rod has a recess and the separable rod portion has at one end at least one projection detachably engageable with the recess in the piston rod.

* * * * *